(12) United States Patent
Sussmann et al.

(10) Patent No.: US 8,206,630 B2
(45) Date of Patent: Jun. 26, 2012

(54) METHOD FOR PRODUCING A CLEAT SOLE

(75) Inventors: Reinhold Sussmann, Scheinfeld (DE); Peter Schmid, Central Hongkong (HK)

(73) Assignee: Puma SE, Herzogenaurach (DE)

( * ) Notice: Subject to any disclaimer, the term of this patent is extended or adjusted under 35 U.S.C. 154(b) by 376 days.

(21) Appl. No.: 12/597,393

(22) PCT Filed: Apr. 17, 2008

(86) PCT No.: PCT/EP2008/003111
§ 371 (c)(1),
(2), (4) Date: Feb. 9, 2010

(87) PCT Pub. No.: WO2008/128712
PCT Pub. Date: Oct. 30, 2008

(65) Prior Publication Data
US 2010/0139014 A1    Jun. 10, 2010

(30) Foreign Application Priority Data
Apr. 24, 2007   (DE) .......................... 10 2007 019 270

(51) Int. Cl.
*B29C 45/14*   (2006.01)
(52) U.S. Cl. .......... 264/250; 264/263; 264/278; 264/318
(58) Field of Classification Search .................. 264/243, 264/244, 248, 250, 263, 278, 318; 425/DIG. 58
See application file for complete search history.

(56) References Cited

U.S. PATENT DOCUMENTS

| | | | |
|---|---|---|---|
| 2,658,238 A * | 11/1953 | Rizzo | ............................. 264/276 |
| 3,609,889 A | 10/1971 | Calvin et al. | |
| 3,925,529 A | 12/1975 | Bernier et al. | |
| 5,887,371 A | 3/1999 | Curley, Jr. | |
| 6,041,526 A | 3/2000 | Collins | |
| 6,705,027 B1 | 3/2004 | Campbell | |

FOREIGN PATENT DOCUMENTS

DE     2828561    1/1980

(Continued)

*Primary Examiner* — Jill Heitbrink
(74) *Attorney, Agent, or Firm* — Lucas & Mercanti, LLP

(57) ABSTRACT

The invention relates to a method for the production of a sole (3) having at least one cleat (1), wherein the cleat (1) is arranged at the bottom side (2) of the sole (3). To improve the demoulding of the sole supplied with cleats from the injection molding tool, the invention comprises the steps: a) Production of at least on cleat (1), wherein the cleat (1) has a cleat base body (4) which can be connected with the sole (3), wherein at least one extension (5) is arranged at the cleat base body (5) which extents toward the ground; b) Inserting of the cleat (1) in a holding part (6), wherein the holding part (6) has a congruent receiving space (7) for at least a part of the cleat base body (4) and for the extension (5); c) Placing of the cleat (1) together with the holding part (6) in a recess (8) in a at least two-part injection molding tool (9, 10), so that a part of the cleat (1) projects into the cavity (11) which is formed between the parts of the injection molding tool; d) Injection molding of at least a part of the sole (3) by injecting of plastic melt into the cavity (11) of the injection molding tool (9, 10), so that a part of the cleat (1) is coated by the plastic melt; e) Demoulding of the injection-molded sole (3) together with the coated cleat (1) and the holding part (6); f) Removing of the holding part (6) from the cleat (1).

10 Claims, 4 Drawing Sheets

FOREIGN PATENT DOCUMENTS

| | | |
|---|---|---|
| DE | 30 32 268 Y | 4/1982 |
| EP | 0 039 268 A | 11/1981 |
| EP | 1 591 031 A | 11/2005 |
| JP | 01320001 | 12/1989 |

* cited by examiner

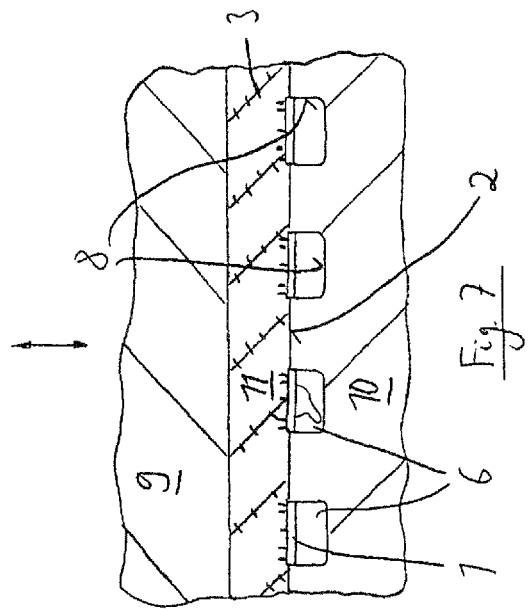
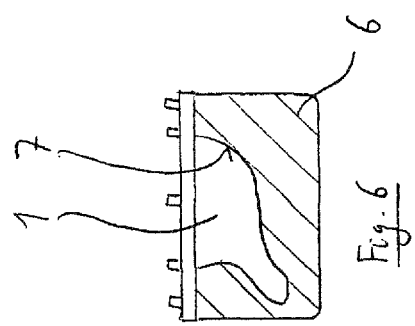
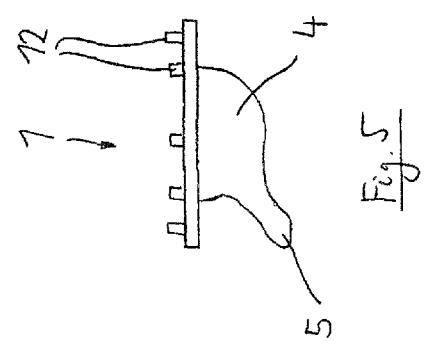
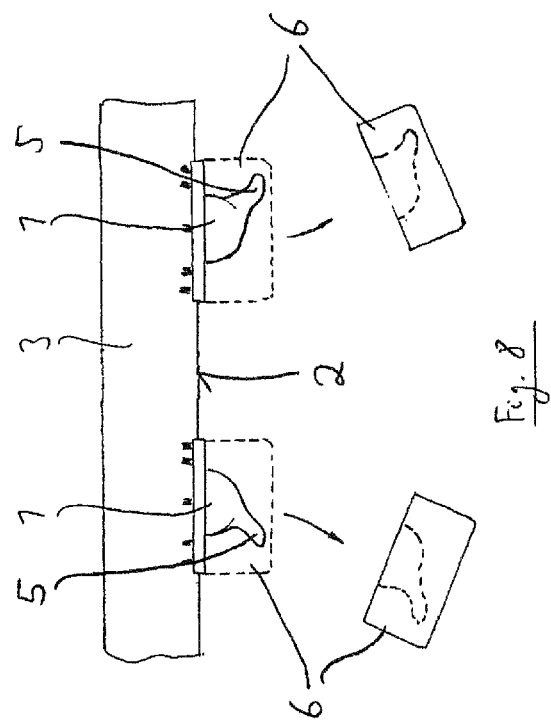

METHOD FOR PRODUCING A CLEAT SOLE

This application is a 371 of PCT/EP2008/003111 filed Apr. 17, 2008, which in turn claims the priority of DE 10 2007 019 270.5 filed Apr. 24, 2007, the priority of both applications is hereby claimed and both applications are incorporated by reference herein.

The invention relates to a method for the production of a sole having at least one cleat, wherein the cleat is arranged at the bottom side of the sole.

Shoes having cleats are well known in the state of the art. Here, not only cleats which are rotationally symmetric are used which is the usual application. Also, the cleats which are fixed at the bottom side of a shoe sole can have asymmetric forms.

WO 00/15068 A1 shows cleats which are anchored at the bottom side of a shoe sole, wherein the cleats are substantially triangular in a vertical projection, amongst others. FR 2 818 876 A1 shows cleats having an elongated shape.

Here, the cleats extend mostly in vertical direction with their longitudinal axis, i.e. perpendicular to the surface of the sole.

DE 30 32 268 A1 shows cleats which are also arranged angular (in the side area of the sole), i.e. they are directed to the side. A similar solution shows DE 28 28 561 A1.

For some applications it is desirable that the basic effect of the cleat shoe remains in force but that a specific resistance in a defined direction is established against slipping of the foot on the ground to the side. A typical example is a golf shoe which must have a specific grip on the ground and especially on grass due to the kinetics during a hit with a golf club.

If the asymmetry of the cleat exceeds a certain amount, problems can occur during the production of the shoe and its cleat sole respectively. Because the sole is mostly produced by an injection moulding process it is advised that cleats are insert moulded which are inserted into the injection moulding tool as a pre-formed part. Thereby, it is a problem that the demoulding of the injection moulded sole together with cleats can be difficult, if the cleats have undercuts with respect to the open and closing direction of the injection moulding tool.

In fact, this problem can be solved by a complex tool technique (die pushing devices in the injection moulding tool), but the necessary expenditure is very high.

Also this method fails totally if the cleats are arranged in different directions at the sole, so that no common undercut-free deforming direction for all cleats exists. Thus, those problems even aggravate if it is desired that a cleat sole is supplied with a plurality of cleats which all have an individual asymmetrical alignment at the sole.

Thus, it is the object of the invention to further develop a method of the kind mentioned above, which makes it possible to produce a cleat sole with cleats formed in any direction in an easy manufacturing way, wherein the alignment of the cleats can be chosen arbitrary. If applicable, it should also be possible in an easy manner to change the orientation of single cleats without causing noteworthy manufacturing problems. Furthermore, the method according to the invention should be characterized by a cost effective possibility of realization. So, it should become possible to produce a shoe, especially a golf shoe, which is characterized by an improved grip on the ground, wherein the specific kinetics of golf should be taken into account. The forces which occur here should be transmitted selectively into the required directions to provide an optimal hold for the foot of the golf player on the ground.

The solution of this object by the invention is characterized in that the method comprises the steps:

a) Production of at least on cleat, wherein the cleat has a cleat base body which can be connected with the sole, wherein at least one extension is arranged at the cleat base body which extents toward the ground during intended use and wherein the vertical projected area of the end of the extension which is facing the ground is arranged at least partially, preferably completely, outside of the vertical projected area of the cleat base body;
b) Inserting of the cleat in a holding part, wherein the holding part has a congruent receiving space for at least a part of the cleat base body and for the extension;
c) Placing of the cleat together with the holding part in a recess in an at least two-part injection moulding tool, so that a part of the cleat projects into the cavity which is formed between the parts of the injection moulding tool;
d) Injection moulding of at least a part of the sole, preferably of the complete sole, by injecting of plastic melt into the cavity of the injection moulding tool, so that a part of the cleat is coated by the plastic melt;
e) Demoulding of the injection-moulded sole together with the coated cleat and the holding part;
f) Removing of the holding part from the cleat.

By this process it is possible—as it will be apparent in detail later on—to form cleats at a sole in a cost efficient way, which sole has to be produced by injection moulding, wherein the cleats have undercuts with respect to the opening direction of the injection moulding tool. The deforming of the sole with the cleats, which are coated by the material of the sole, is possible in an unproblematic way.

The holding part is preferably designed undercut-free in open and closing direction of the injection moulding tool when being inserted in its position in the recess in the injection moulding tool. Especially it is provided that the holding part has a cylindrical shape, wherein the holding part is inserted into the recess in the injection moulding tool in such a way that the axis of the cylinder is directed in open and closing direction of the injection moulding tool.

Before the injection moulding of the sole takes place according to above step d) a laminar shaped reinforcing part can be inserted in the cavity of the injection moulding tool. Thereby, the reinforcing part comprises preferably glass fibre or carbon fibre.

Specifically preferred is that at least two cleats are arranged at the sole, wherein at least two extensions of two cleats are directed in different directions.

During injection moulding of the sole according to above step d) a plurality of anchor elements which are arranged at the cleat base body can be coated with material of the sole.

To guarantee an easy loosening of the holding part after the injection moulding the holding part can be produced from polyamide (trade name Nylon).

The cleat by itself can be produced as a two-component plastic part. It can consist at least partially of thermoplastic elastomere material on a urethane basis (TPU).

Thus, at the cleat base body at least one extension is arranged, which extends toward the ground, wherein the extension leaves with its end, which is facing the ground, the vertical projected area of the cleat base body. Thus, the cleat is characterized in that an extension with a defined alignment is provided beside the actual cleat base body, which extension leaves the vertical projected area of the cleat base body, whereby a specific good side hold of the cleat at the ground is produced.

Preferably, the extension has an elongated shape with a longitudinal axis. The longitudinal axis of the extension and the vertical direction include preferably an angle between 20° and 60°, specifically an angle between 30° and 50°.

The extension can have a substantially rectangular shape at least in sections in a cross section perpendicular to its longitudinal axis.

The cleat base body and the at least one extension are preferably formed integrally as an injection moulded part. The cleat base body and the at least one extension consist preferably of thermoplastic elastomere material on a urethane basis (TPU).

The form of the cleat base body is preferably a hemisphere. To make it possible to firmly fix the cleat in the sole, an embodiment of the invention suggests that the cleat base body comprises anchor elements for anchorage in the sole. These can be cylinders which extend in vertical direction and which are coated by the material of the sole. Preferably a plurality of cylinders is arranged around the circumference of the cleat base body at its end facing the sole. Preferably it is further suggested that the anchor elements are arranged at a disk which in turn is connected with the cleat base body.

The shoe sole has at least one cleat of the mentioned kind. There, it is preferably proposed that at least two cleats are arranged on the sole, wherein the extensions of the at least two cleats are directed in at least two different directions.

The invention is used with specific advantages for a golf shoe.

In the drawing an embodiment of the invention is shown.

FIG. 3 shows the cross section A-B according to FIG. 1,

Figure 4:
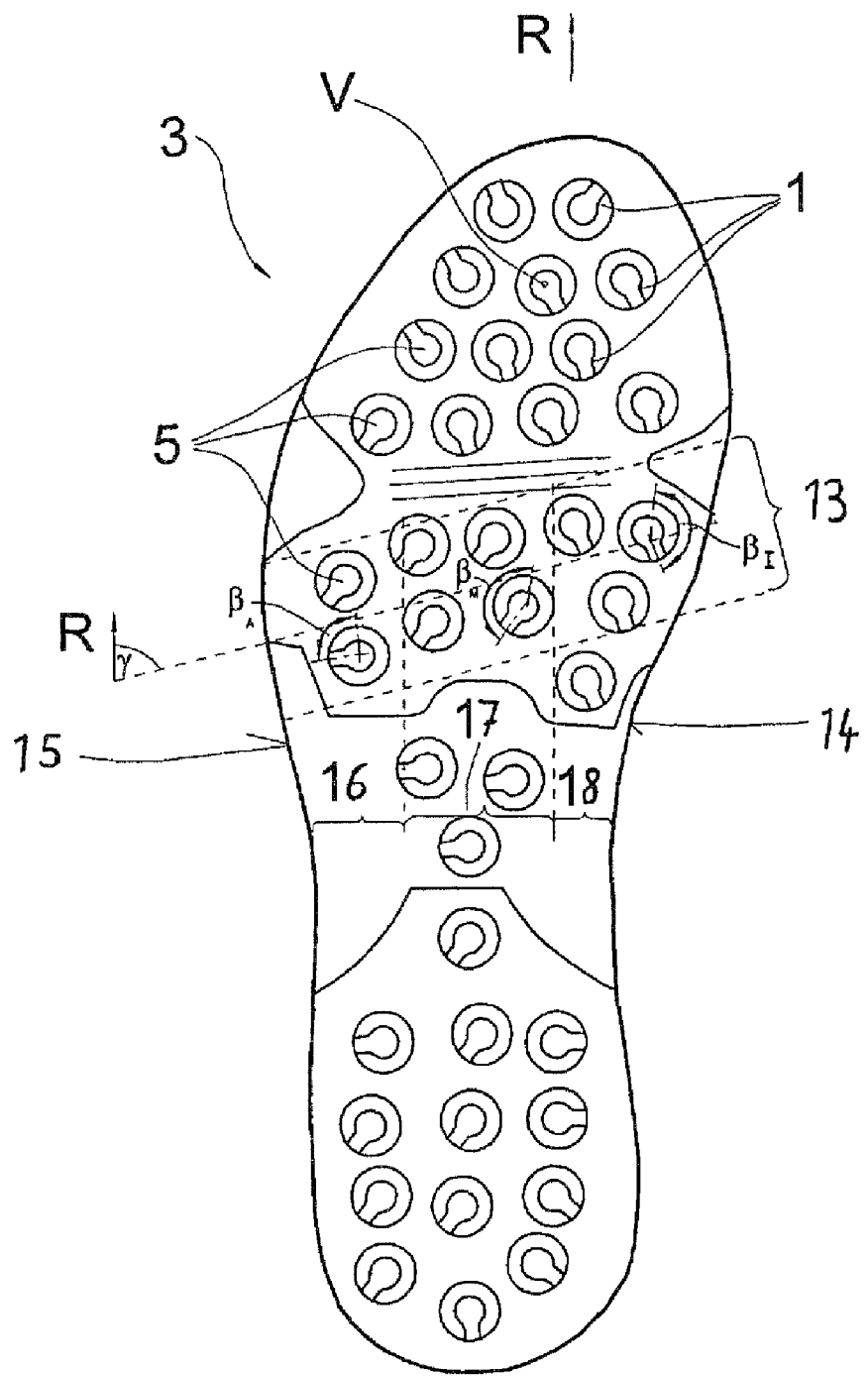

FIG. 4 shows the top plan view of the bottom side of a sole of a golf shoe, which is supplied with a plurality of cleats, FIG. 5 shows the cleat after its production and before it is connected with the sole, FIG. 6 shows the cleat as it is held by a holding part, FIG. 7 shows a section of a two-part injection moulding tool with an injection moulded sole, wherein a plurality of holding parts together with cleats are inserted in recesses in the injection moulding tool and FIG. 8 a section of the deformed finished sole, from which the holding parts are removed.

Figure 1:
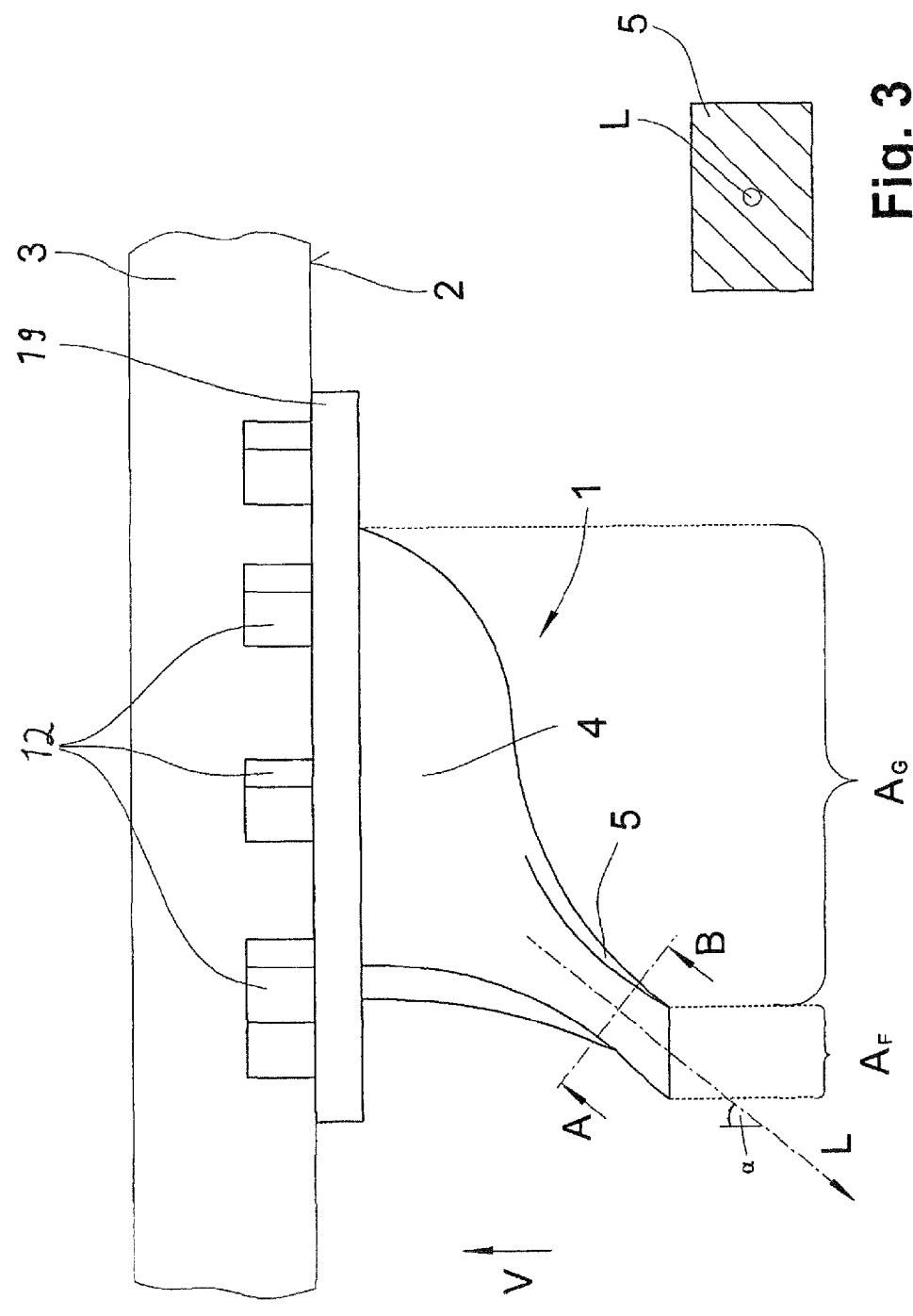
FIG. 1 shows a side view of a cleat, which is anchored in a sole.
Figure 2:
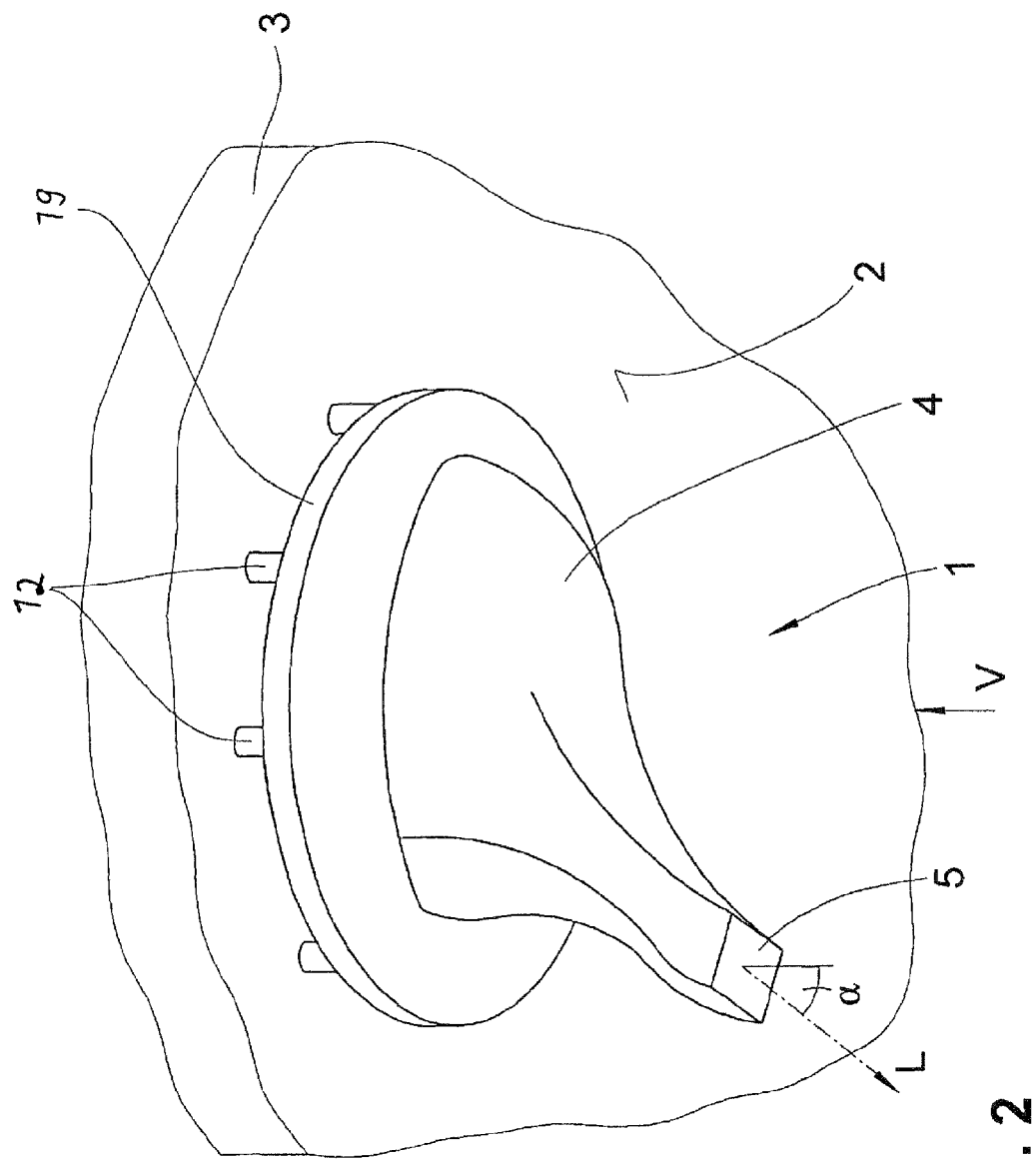
FIG. 2 shows a perspective view of the cleat according to FIG. 1.

In FIG. 1 and FIG. 2 a cleat 1 is depicted, which is anchored at the bottom side 2 of a sole 3 of a shoe. The cleat 1 has a cleat base body 4 which has a substantially hemispherical shape. If the cleat base body 4 is regarded—see FIG. 1—it can be observed that it defines a projected area $A_G$, which becomes apparent when regarded from vertical direction V; this is circular shaped in the embodiment.

The safe anchoring of the cleat 1 in the sole 3 is effected by a plurality of anchor elements 12. These are implemented as substantial cylindrical pins, which extend in vertical direction V and which are coated by injection moulding during the production of the shoe and the sole respectively—as will be apparent in detail later on. A clear abutment of the cleat 1 at the sole 3 is accomplished by a disk 19, which bears the anchor elements 12 and is connected in turn with the cleat base body 4. The cleat base body 4, the disk 19 and the anchor elements 12 are made as an integrated part.

It is important, that at the cleat base body 4 at least one extension 5 is arranged which extends toward the ground. Thereby, the extension 5 leaves with its end which is facing the ground—as can be seen best in FIG. 1—the vertical projected area $A_G$ of the cleat base body 4. I.e. the vertical projected area $A_F$ of the end of the extension 5 facing the ground (which is rectangular in the embodiment) lies at least partially, preferably completely (as shown in the embodiment) outside the vertical projected area $A_G$ of the cleat base body 4.

There, the extension 5 is rod-shaped, so that a longitudinal axis L is defined, along which the extension 5 extends. This longitudinal axis L and the vertical direction include an angle α, which is approximately 40° in the embodiment.

As can be seen in FIG. 3 the extension has a substantial rectangular cross section (see cross section A-B according to FIG. 1).

With the proposed design it becomes possible to establish in addition to the known cleat-effect—caused by the cleat base body 4—a specific side hold of the cleat 1 at the ground, what is established by the extension 5.

In this regard a possible embodiment is shown for a golf shoe in FIG. 4. Here, the sole 3 of the golf shoe can be seen from the bottom side, on which a plurality of cleats 1 is fixed.

Each cleat 1 has an extension 5, which extends as shown in FIG. 1. The projection on the ground delivers the alignment of the extension 5, which can be seen in FIG. 4. It can be seen that the extensions 5 are aligned in a different manner, i.e. they are directed to different sides. Namely it can be seen, that an angle β can be defined which is included between the projection of the extension 5 on the ground and the longitudinal axis R of the shoe. This is marked for the middle sole region in FIG. 4 for three cleats 1.

In the embodiment according to FIG. 4 it is provided that at least one of the shoes of a pair of shoes is supplied with cleats 1 along an imaginary band 13, which extends across the width of the sole 3 from the sole inner side 14 to the sole outer side 15.

Its extension 5 in the outer sole region 16 is arranged under an angle $β_A$ between 60° and 135° to the longitudinal axis R of the shoe to the outer side. In the middle sole region 17 the extension 5 is aligned under an angle $β_M$ between 135° and 225° to the longitudinal axis R of the shoe rearwards. Finally, in the inner sole region 18 the extension 5 is aligned under an angle $β_I$ between 90° and 180° to the longitudinal axis R of the shoe to the inner side.

Thereby, the imaginary band 13 extends from the sole outer side 15 under an angle γ between 30° and 90°, preferably between 40° and 50°, to the longitudinal axis R of the shoe in the direction to the sole inner side 14. Furthermore, the imaginary band 13 begins at the sole outer side 15 approximately in the middle between the front and rear end of the sole 3. As can be seen, four till fife cleats 1 are arranged side by side along the imaginary band 13.

The adjustment of the cleats 1 in the explained manner has the advantage, that the forces due to the kinetics during the hit of a golf ball, which must be transmitted via the shoe to the ground, can be transferred in an optimal way. So, especially when playing golf an improved hold of the shoe at the ground is established.

The adjustment of the cleats 1 in the explained manner takes into account that during the hit of a ball with a golf club along the process of the hit forces must be transferred in different manner from the golf club via the player and his legs to the ground. When using the alignment of the cleats 1 with its extensions 5 especially within the imaginary band 13 optimal results are achieved in this regard.

In the embodiments in each case only a single extension 5 is arranged at the cleat base body 4. But also two or three extensions 5 can be provided which then extend star-shaped to one side direction of the cleat 1.

The two soles of a pair of shoes must not necessarily be equipped with cleats in a mirrored way. It can also be reasonable that the two shoes are equipped with cleats in different manner.

To allow a production which is beneficial in terms of manufacturing the invention provides a method which is depicted in FIGS. 5 till 8 exemplarily.

At first, in FIG. 5 can be seen a pre-manufactured cleat 1 which is made e.g. as a two-component injection moulded part. As mentioned, also anchor elements 12 are formed at it, which have the form of cylindrical pins.

In the next process step, according to FIG. 6 the cleat 1 is inserted into a holding part 6. The holding part 6 has a receiving space 7 which is designed congruent to the surface of the cleat 1. I.e. the cleat 1 is accurately fitting into the receiving space 7.

According to the next process step, which is shown in FIG. 7, the cleats 1 together with their respective holding parts 6 are inserted into recesses 8 which are machined into a half 10 of a two-part injection moulding tool 9, 10. The two tool parts 9, 10 are forming together a cavity 11 in known manner which is filled with melt to produce the desired injection moulded part, which is the sole 3 here.

As can further be seen in FIG. 7 an end area of the cleats 1 projects into the cavity 11 of the tool 9, 10, namely that area with the anchor elements 12, so that this area is coated during injection of melt into the cavity 11.

The recesses 8 are formed cylindrically here and correspond to the cylindrical shape of the holding parts 6. This causes that during opening and closing of the injection moulding tool 9, 10 in the direction of the double arrow in FIG. 7 an undercut-free deforming of the holding part 6 is possible.

When the two halves of the injection moulding tool 9, 10 are opened and the injection moulded part is removed a configuration arises as depicted in FIG. 8 namely with the holding parts 6 as shown in dashed lines. Due to the undercut-free design of the holding parts 6 an unproblematic deforming of the holding part 6 is given. If the sole 3 together with the holding parts 6 is then deformed, the holding parts 6 can be taken away by lateral pivoting (see arrow in FIG. 8) and thus the cleats 1 are bared.

The finished sole 3 it then ready for further use.

It is an advantage of the proposed method that it is unproblematic to attach cleats with undercut in deforming direction of the tool at the sole by injection without getting manufacturing problems. The holding parts 6 open up the possibility to effect an easy manufacturing without die pushing devices in the tool etc.

Furthermore, it is possible beneficially without problems to position the single cleats 1 relatively to another in any alignment without any deforming problems. Especially, it is possible in an easy way to change the alignment of the single cleats in a cost effective way if this is desired. For doing so, no cost-intensive tool changes are necessary. Also it is possible in an easy way to change the shape of the cleats by using other holding parts.

The holding parts 6 consist preferably of a material like polyamide (Nylon) which is easy to loosen. Therewith, a holding part 6 can be used several times.

REFERENCE NUMERALS

1 Cleat
2 Bottom Side
3 Sole
4 Cleat base body
5 Extension
6 Holding part
7 Congruent receiving space
8 Recess
9 Part of the injection molding tool
10 Part of the injection molding tool
11 Cavity
12 Anchor element
13 Imaginary band
14 Sole inner side
15 Sole outer side
16 Outer sole region
17 Middle sole region
18 Inner sole region
19 Disk
$A_G$ Vertical projected area of the cleat base body
$A_F$ Vertical projected area of the end of the extension
L Longitudinal axis
α Angle
V Vertical direction
R Longitudinal axis of the shoe
$β_A$ Angle
$β_M$ Angle
$β_I$ Angle
γ Angle

The invention claimed is:

1. Method for the production of a sole having at least one cleat, wherein the cleat is arranged at the bottom side of the sole,
 the method comprises:
   a) Producing of at least one cleat, wherein the cleat has a cleat base body which can be connected with the sole, wherein at least one extension is arranged at the cleat base body which extents toward the ground during intended use and wherein the vertical projected area ($A_F$) of the end of the extension which is facing the ground is arranged at least partially outside of the vertical projected area ($A_G$) of the cleat base body;
   b) Inserting of the cleat in a holding part, wherein the holding part has a congruent receiving space for at least a part of the cleat base body and for the extension;
   c) Placing of the cleat together with the holding part in a recess in an at least two-part injection moulding tool, so that a part of the cleat projects into the cavity which is formed between the parts of the injection moulding tool;
   d) Injection moulding of at least a part of the sole by injecting of plastic melt into the cavity the injection moulding tool, so that a part of the cleat is coated by the plastic melt;
   e) Demoulding of the injection-moulded sole together with the coated cleat and the holding part;
   f) Removing of the holding part from the cleat.

2. The method according to claim 1, wherein the holding part is designed undercut-free in open and closing direction of the injection moulding tool when being inserted in its position in the recess in the injection moulding tool.

3. The method according to claim 2, wherein the holding part has a cylindrical shape, wherein the holding part is inserted into the recess in the injection moulding tool in such a way that the axis of the cylinder is directed in open and closing direction of the injection moulding tool.

4. The method according to claim 1, wherein before the injection moulding of the sole takes place according to step d) a laminar shaped reinforcing part is inserted in the cavity of the injection moulding tool.

5. The method according to claim 4, wherein the reinforcing part comprises glass fibre or carbon fibre.

6. The method according to claim 1, wherein at least two cleats are arranged at the sole, wherein at least two extensions of two cleats are directed in different directions.

7. The method according to claim 1, wherein during injection moulding of the sole according to step d) a plurality of anchor elements which are arranged at the cleat base body is coated with material of the sole.

8. The method according to claim 1, wherein the holding part is produced from polyamide.

9. The method according to claim 1, wherein the cleat is produced as a two-component plastic part.

10. The method according to claim 1, wherein the cleat consists at least partially of thermoplastic elastomer material on a urethane basis (TPU).

* * * * *